United States Patent
Van Leyen et al.

(10) Patent No.: US 9,328,488 B2
(45) Date of Patent: May 3, 2016

(54) THREAD DOWN FAUCET HUB FOR TUB/SHOWER VALVE

(71) Applicant: PRICE PFISTER, INC., Lake Forest, CA (US)

(72) Inventors: Jan Christopher Van Leyen, Irvine, CA (US); Victor Tung, Rowland Heights, CA (US); Alston Williams, Irvine, CA (US)

(73) Assignee: Price Pfister, Inc., Lake Forest, CA (US)

( * ) Notice: Subject to any disclaimer, the term of this patent is extended or adjusted under 35 U.S.C. 154(b) by 95 days.

(21) Appl. No.: 14/191,525

(22) Filed: Feb. 27, 2014

(65) Prior Publication Data

US 2014/0260769 A1    Sep. 18, 2014

Related U.S. Application Data

(60) Provisional application No. 61/793,288, filed on Mar. 15, 2013.

(51) Int. Cl.
*E03C 1/04*    (2006.01)
*F16K 31/60*   (2006.01)

(52) U.S. Cl.
CPC ............ *E03C 1/0412* (2013.01); *F16K 31/605* (2013.01); *Y10T 74/20612* (2015.01)

(58) Field of Classification Search
CPC ..... E03C 1/0412; E03C 1/0402; E03C 1/042; F16K 31/605; F16K 31/60
See application file for complete search history.

(56) References Cited

U.S. PATENT DOCUMENTS

| | | | | |
|---|---|---|---|---|
| 5,826,615 A | * | 10/1998 | Ko | F16K 11/0746 137/454.6 |
| 6,807,983 B1 | * | 10/2004 | Erickson | E03C 1/042 137/15.01 |
| 7,631,655 B1 | * | 12/2009 | Kopp | E03C 1/04 137/15.18 |
| 2002/0125453 A1 | * | 9/2002 | Donath, Jr. | F16K 31/60 251/288 |
| 2004/0144434 A1 | * | 7/2004 | Jones | E03C 1/04 137/637.2 |
| 2006/0174946 A1 | * | 8/2006 | Kajuch | F16D 3/2057 137/360 |
| 2009/0108223 A1 | * | 4/2009 | Deutsch | F16K 11/0743 251/284 |
| 2009/0288714 A1 | * | 11/2009 | Niver | F16K 19/006 137/315.17 |
| 2011/0100484 A1 | * | 5/2011 | Allen | E03C 1/023 137/359 |

* cited by examiner

*Primary Examiner* — Craig Schneider
*Assistant Examiner* — Kevin Barss
(74) *Attorney, Agent, or Firm* — Barnes & Thornburg LLP

(57) ABSTRACT

A bath spout faucet assembly having a handle portion and a hub portion. The handle portion includes a bore disposed therein. The handle portion may also include a cylindrically-formed slot located around the bore. The hub portion is sized to fit into the cylindrically-formed slot of the handle portion. The cylindrically-formed hub portion forms an opening that is configured to be in communication with the bore in the handle portion, and is configured to receive a stem portion of a valve assembly. The bore in the handle portion is configured to receive the stem portion and the handle portion is configured to rotate the stem portion.

15 Claims, 12 Drawing Sheets

THREAD DOWN FAUCET HUB FOR TUB/SHOWER VALVE

RELATED APPLICATIONS

The present application is related to and claims priority to U.S. Provisional Patent Application Ser. No. 61/793,288, filed on Mar. 15, 2013, entitled "Thread Down Hub for Tub-Shower Valve." The subject matter disclosed in that provisional application is hereby expressly incorporated into the present application in its entirety.

TECHNICAL FIELD

The present disclosure relates to shower and/or bath trim kit assemblies and, more particularly, to a new handle design for a shower and/or bath faucet.

BACKGROUND AND SUMMARY

Shower and bath trims or trim kit assemblies are traditionally composed of shower head and tub filler assemblies. An on-and-off handle assembly or faucet is included that activates a valve to distribute hot or cold water to the shower head or tub filler. In conventional faucet assemblies, the handle engages a keyset on a stem that extends from the valve. As the handle rotates either clockwise or counterclockwise, the key behind the handle rotates therewith. This causes the valve to open or close, as well as mix hot and cold water. The handle is secured to the valve stem, typically by a set screw that press fits against the stem so the handle will not come off. A cylindrical threaded sleeve attaches a trim shower flange against the shower wall. The sleeve is cylindrical so the valve stem may stick out through the sleeve and engage the handle. The handle typically shrouds the sleeve and rotates relative thereto for turning the water on and off. In addition to holding the flange plate in place, the sleeve also helps keep the water from getting between the handle and the flange and thus back behind the shower wall.

An issue with these conventional designs is that the front of the handle sits a significant distance from the key portion of the stem which is what activates the valve. This has the effect of lessening the perceived robustness of the handle feel as it rotates clockwise or counterclockwise.

An illustrative embodiment of this present disclosure includes a trim kit having a newly-designed thread-down handle hub to provide a more robust handle feel. The new hub stabilizes the handle by significantly elongating the bearing or contact surface that engages the handle. In addition, the aforementioned cylindrical sleeve is no longer required to hold the trim flange against the shower wall. Instead, a portion of the handle hub itself serves as a retainer for the flange.

Another illustrative embodiment of the present disclosure includes a bath spout faucet assembly comprising a handle portion and a hub portion. The handle portion includes a bore disposed therein. The handle portion also includes a cylindrically-formed slot located concentrically around the bore. The hub portion is cylindrically-formed and sized to fit into the cylindrically-formed slot of the handle portion. The cylindrically-formed hub portion forms an opening that is configured to be in communication with the bore in the handle portion, and configured to receive a stem portion of a valve assembly. The handle portion is configured to rotate with respect to the hub portion. The bore in the handle portion is configured to receive the stem portion and the handle portion is configured to rotate the stem portion.

In the above and other embodiments, the bath spout faucet assembly further comprises: at least one o-ring fitted on the hub portion and configured to be located between the hub portion and an outer wall surface of the cylindrically-formed slot; the handle portion that includes a handle and a handle block, wherein the cylindrically-formed slot and bore are located in the handle block; a fastener that couples the handle and the handle block together; the bore including a periphery surface which has a broach pattern configured to engage a surface texture on the stem portion; a stabilizer ring coupled to the handle block and located adjacent the hub portion; the stabilizer ring being attached to the handle portion between the cylindrically-formed slot and the bore; and the hub portion being configured to couple to a flange.

Another illustrative embodiment of the present disclosure provides a bath spout faucet assembly comprising a handle and a hub. The handle has a bore disposed therein and a cylindrically-formed slot located concentrically around the bore. The hub is configured to fit into the cylindrically-formed slot of the handle. The hub is configured to be fixed relative to a shower wall. The hub includes an opening that is configured to be in communication with the bore in the handle, and is configured to receive a stem portion of a valve assembly. The bore in the handle is configured to receive and engage the stem portion. Lastly, the handle is configured to rotate the stem portion.

In the above and other illustrative embodiments, the bath spout faucet assembly may further comprise: at least one o-ring fitted on the hub and configured to be located between the hub and an outer wall surface of the cylindrically-formed slot; the handle being rotatable with respect to the hub; the bore including a periphery surface which has a broach pattern configured to engage a surface texture on the stem portion; a stabilizing fastener coupled to the handle and located adjacent the hub; the stabilizing fastener being attached to the handle between the cylindrically-formed slot and the bore; and the hub being configured to couple to a flange.

Additional features and advantages of the bath spout faucet assembly will become apparent to those skilled in the art upon consideration of the following detailed description of the illustrated embodiment exemplifying the best mode of carrying out the bath spout faucet assembly as presently perceived.

BRIEF DESCRIPTION OF DRAWINGS

The present disclosure will be described hereafter with reference to the attached drawings which are given as non-limiting examples only, in which.

Corresponding reference characters indicate corresponding parts throughout the several views. The exemplification set out herein illustrates embodiments of the thread-down faucet hub, and such exemplification is not to be construed as limiting the scope of the thread-down faucet hub in any manner.

DETAILED DESCRIPTION OF THE DRAWINGS

The present disclosure relates to tub and shower hardware trim assemblies. In particular, the present disclosure relates to a faucet assembly that may be used either with both a shower head and tub filler, or individually with a shower head only or tub filler only. The term bath spout may be used interchangeably for either the shower head and/or the tub filler.

Figure 1:
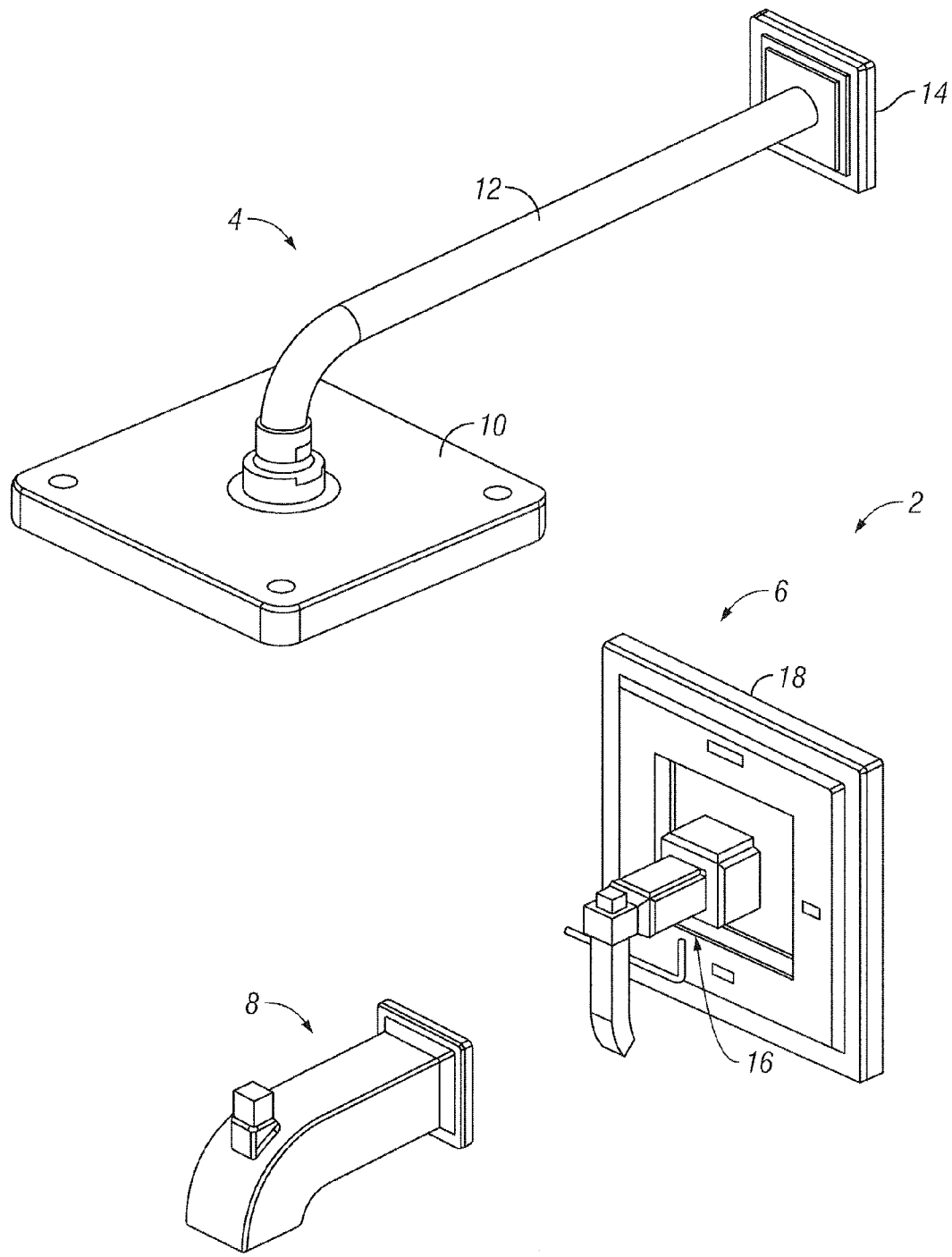
FIG. 1 is a perspective view of a single handle tub and shower faucet handle assembly with a shower head and tub filler.

A perspective view of a single, thread-down handle tub and shower faucet with bath spouts kit 2 including shower head assembly 4, faucet assembly 6, and tub filler 8 is shown in FIG. 1. Shower head assembly 4 includes shower head 10 attached to arm 12 and flange 14. Faucet assembly 6 includes handle assembly 16 and trim shower flange 18.

Figure 2:
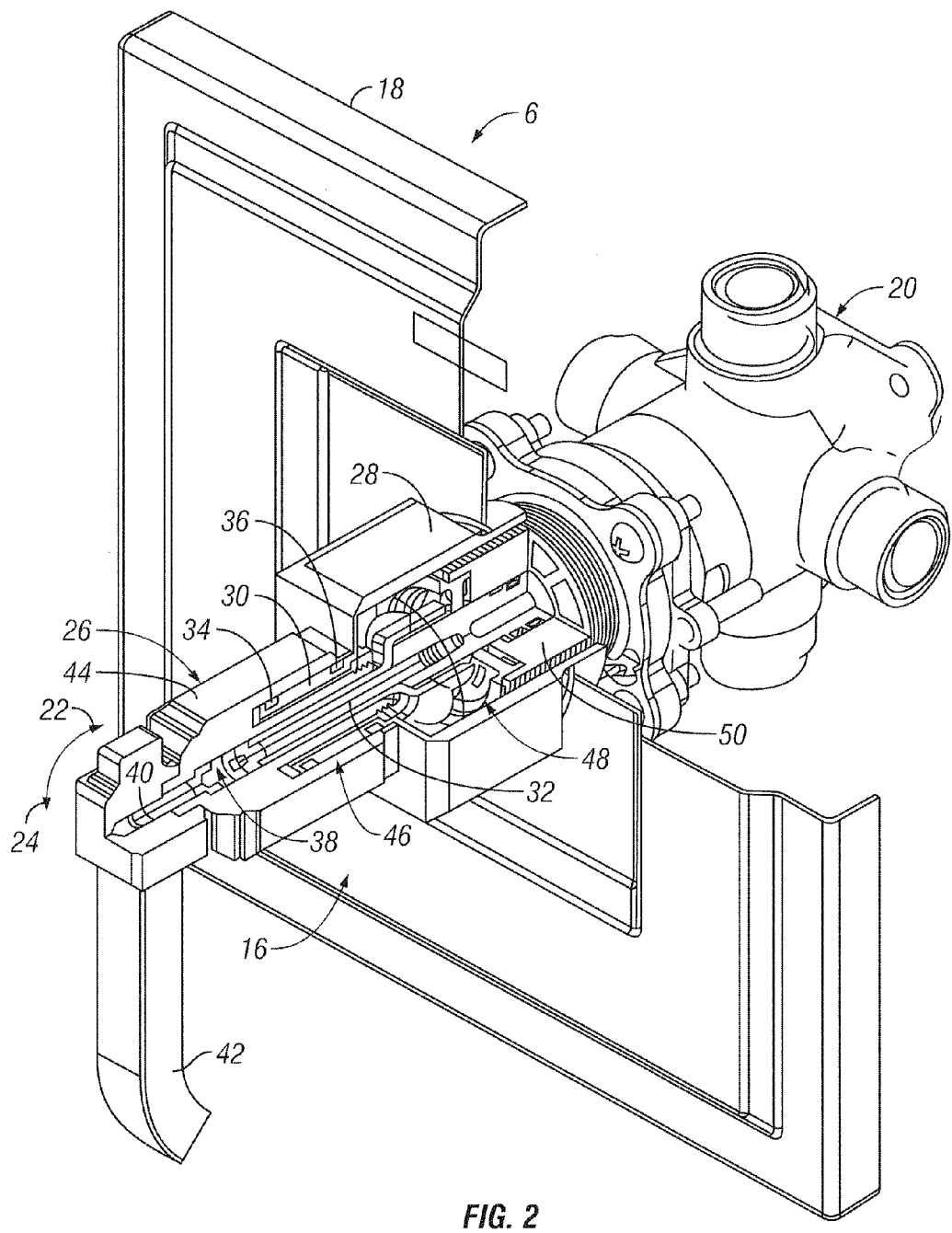
FIG. 2 is a perspective, partially cut-away view of a faucet handle assembly, trim shower flange, and valve.

A partial cut-away perspective view of faucet assembly 6 is shown in FIG. 2. This view shows handle assembly 16 and trim shower flange 18, as well as valve assembly 20. By depicting handle assembly 16 in partial cut-away view, the engagement between valve 20 and handle assembly 16 can be seen. Instead of employing the prior art design that merely includes a stem extending from a valve with a key portion engaging the handle to rotate the valve to open and close positions, this new design employs handle assembly 26 which rotates with respect to a stationary handle hub 28. Handle assembly 26 rotates about a hub portion 30 on handle hub 28 while also rotating valve stem 32, instead of simply rotating a valve stem alone. Rotating about hub 30 provides a wider rotational diameter for handle assembly 26 than merely a small diameter stem. This offers a more robust handle feel when rotating handle assembly 26 in directions 22 or 24.

As shown in this illustrative embodiment, a valve stem 32 extends from valve 20 and is disposed through hub portion 30. As will be discussed further herein, valve stem 32 includes a patterned surface, such as a broach pattern, and fits into cavity 38 of handle assembly 26 which has a corresponding surface to grip stem 32. Also shown in FIG. 2 is fastener 40 that attaches handle grip 42 to handle block 44 to form handle assembly 26. Handle block 44 also includes a cylindrical slot 46 that is configured to receive cylindrical hub portion 30. Handle hub 28 has its own cavity 48 configured to receive a portion of stem 32 that extends to valve 20. Stem base 50 has a threaded periphery corresponding to a threaded periphery in cavity 48 of handle hub 28 to provide the secure connection between hub 28 and valve 20.

Figure 3:
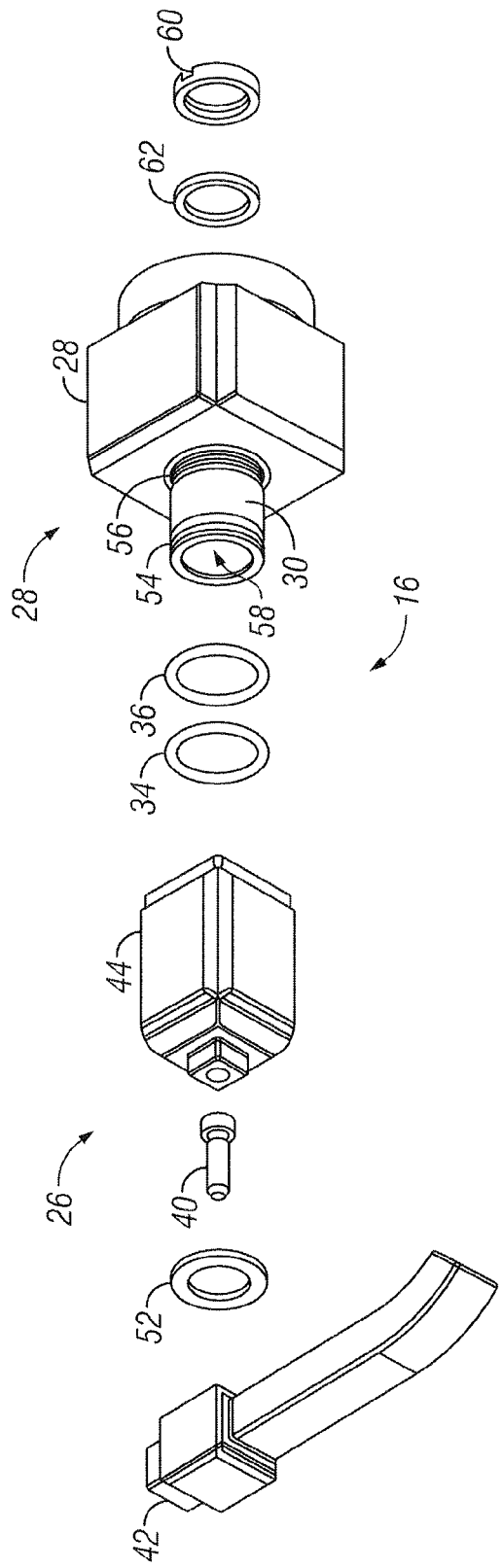
FIG. 3 is an exploded view of the faucet handle assembly.

An exploded perspective view of handle assembly 16, including handle assembly 26 and handle hub 28, is shown in FIG. 3. This view shows the individual components that make up this structure. Handle grip 42 attaches to handle block 44 via fastener 40. A washer 52 is positionable in cylindrical slot 46 to prevent grinding between handle assembly 26 and handle hub 28. Hub portion 30 on handle hub 28 is configured to receive o-rings 34 and 36, illustratively, in receiving channels 54 and 56, respectively. As shown, hub 30 is cylindrically-shaped with opening 58 that allows stem 32 to pass therethrough and into handle block 44. Threaded ring 60 and washer 62 engage a collar portion 68 of block 44 to help stabilize handle assembly 26 while rotating. (See, also, FIG. 5.)

Figure 4:
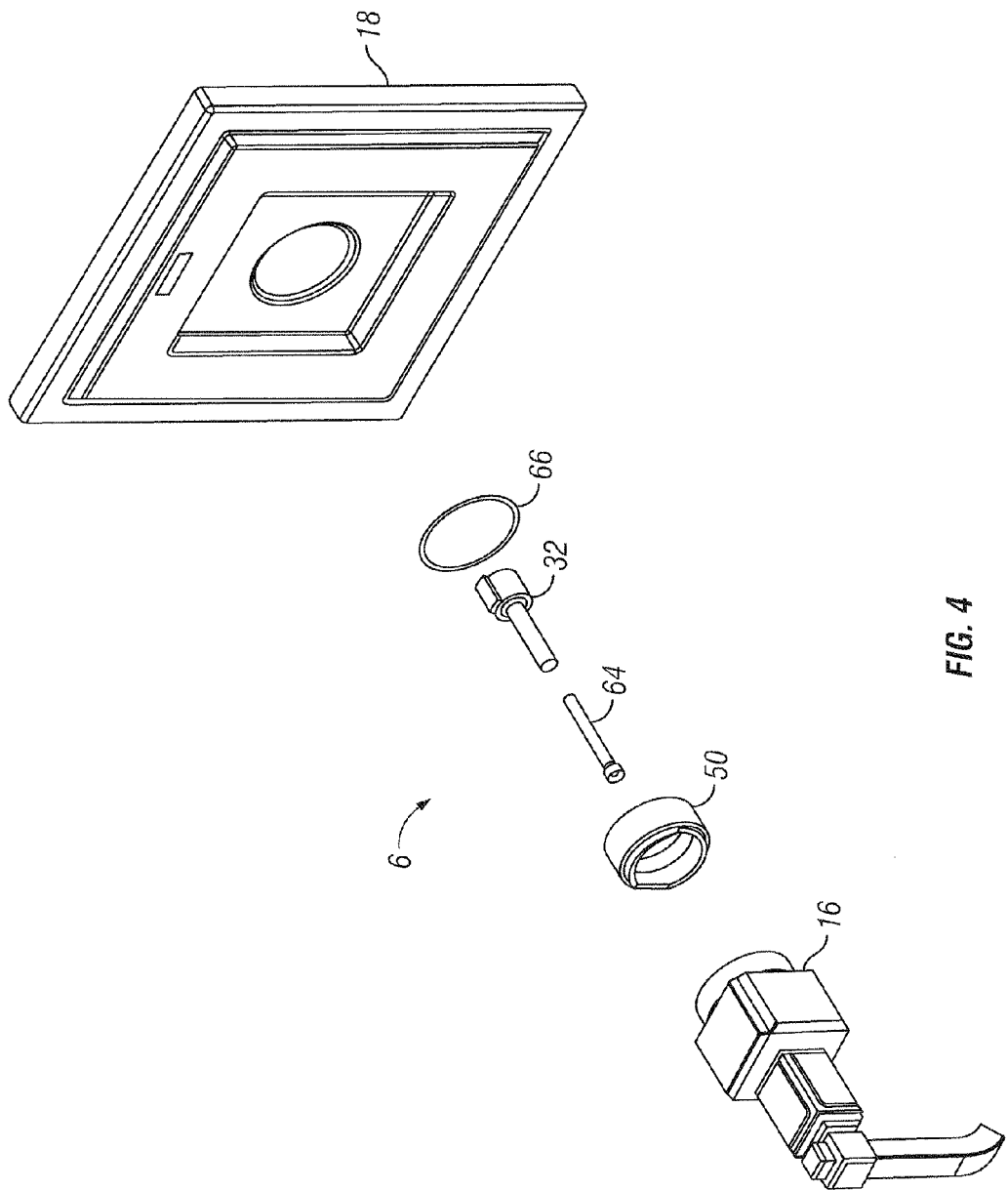
FIG. 4 is an exploded view of the faucet assembly including the faucet handle assembly and trim shower flange.

A perspective, partially-exploded view of faucet assembly 6 along with flange 14 is shown in FIG. 4. This view shows how handle assembly 16 couples to stem base 50 and engages stem 32 which is attached to valve 20 via fastener 64. Washer 66 is located between stem base 50 and valve assembly 20.

Figure 5:
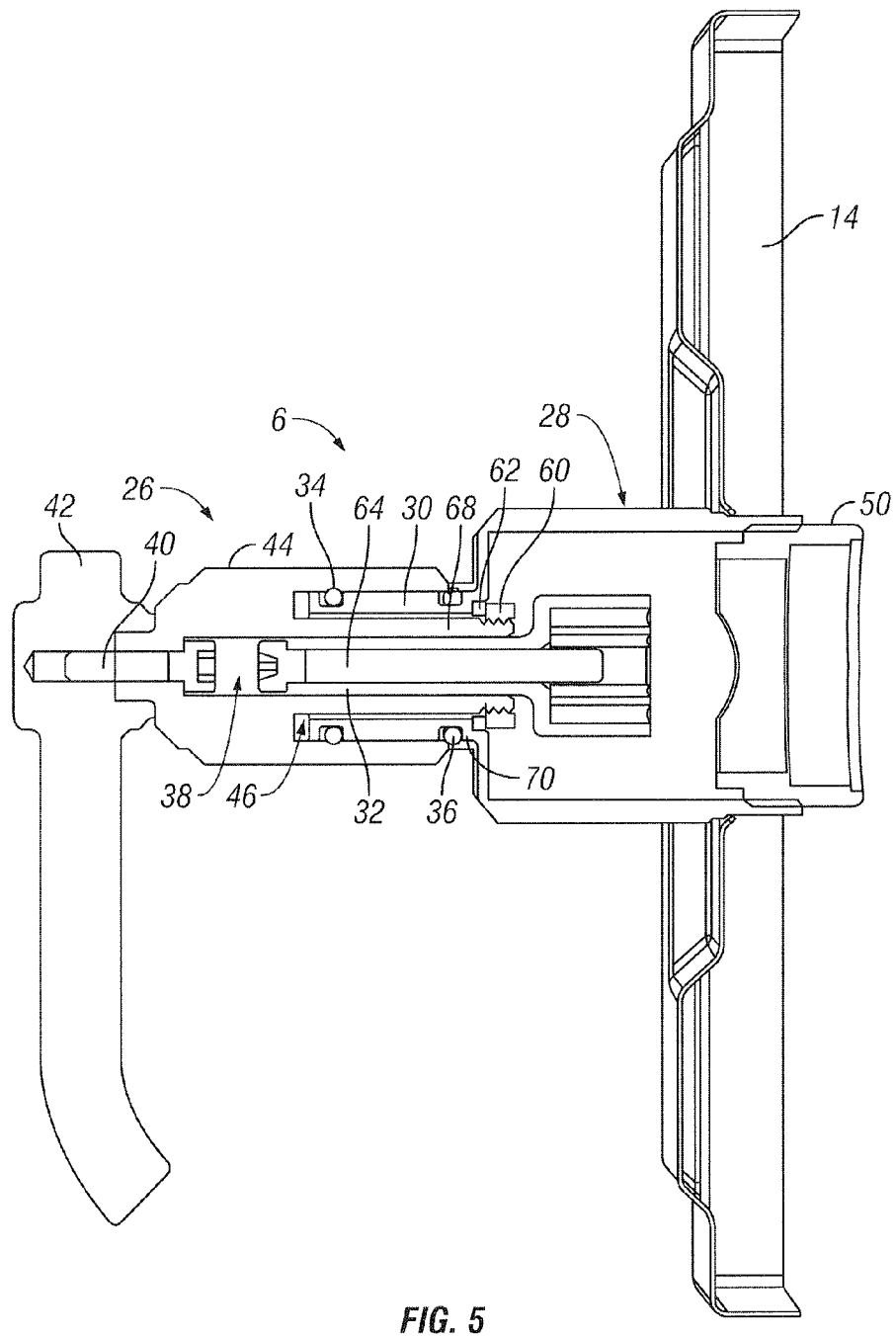
FIG. 5 is a side cross-sectional view of the faucet handle assembly and trim shower flange.

A side cross-sectional view of faucet assembly 6 coupled to flange 18 is shown in FIG. 5. This view demonstrates how rotating handle assembly 26 is rotatable relative to handle hub 28. This view also shows how handle hub 28 is attached to stem base 50. Fastener 64 attaches stem 32 to valve assembly 20. Fastener 40 attaches handle grip 42 to handle block 44. Also shown is cavity 38 and cylindrical slot 46 located in block 44. Cavity 38, as previously discussed, receives valve stem 32 which rotates as handle 42 rotates to turn the water on or off, as well as in some embodiments adjusts temperature. It is appreciated that the broach pattern surface, or other like surface features or patterns on stem 32, may be matched by a corresponding pattern on the wall surface of cavity 38 to ensure the concurrent movement between the structures. Cylindrical slot 46 which is, illustratively, axially aligned with cavity 48 receives hub portion 30 of handle hub 28. O-rings 34 and 36 provide a frictional resistance between block 44 and hub portion 30. It is appreciated from this view how rotating around the support of hub portion 30 provides handle assembly 26 a more robust feel than if rotating around the smaller diameter stem 32 alone. Further assisting in this regard is threaded ring 60 and washer 62, wherein threaded ring 60 engages corresponding threads on cylindrical portion 68 formed between cavity 38 and cylindrical slot 46. As shown, the ring and washer engage shoulder 70 and have the affect of stabilizing handle assembly 26 on handle hub 28. This view also shows how handle hub 28 fastens onto stem base 50 when seated in flange 18.

Figure 6:
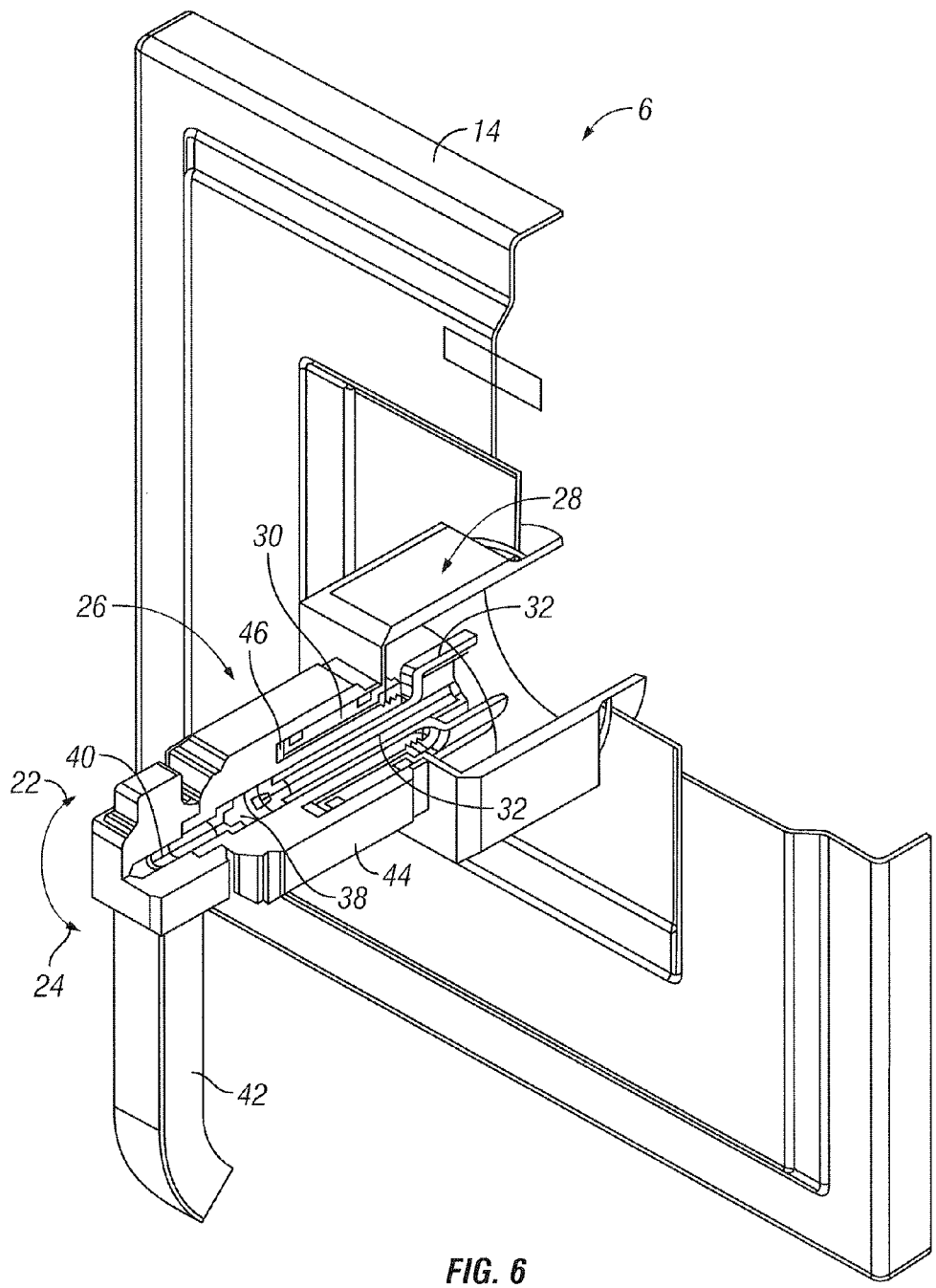
FIG. 6 is a perspective, partially cut-away view of the faucet handle assembly and trip shower flange.

A partial, cross-sectional perspective view of faucet assembly 6 and flange 18, similar to that shown in FIG. 2, but without the valve assembly 20, is shown in FIG. 6. This view, with the valve taken away, further assists illustrating how handle assembly 26 rotates about hub portion 30 to rotate stem 32. The same as discussed in FIG. 2, stem 32 is located in cavity 38, while hub portion 30 is located in cylindrical slot 46. When handle grip 42 rotates in either directions 22 or 24, it rotates block 44 which rotates stem 32 relative to handle hub 28 to turn the water on or off. Handle hub 28 is also disposed in flange 14 as shown.

Figure 7:
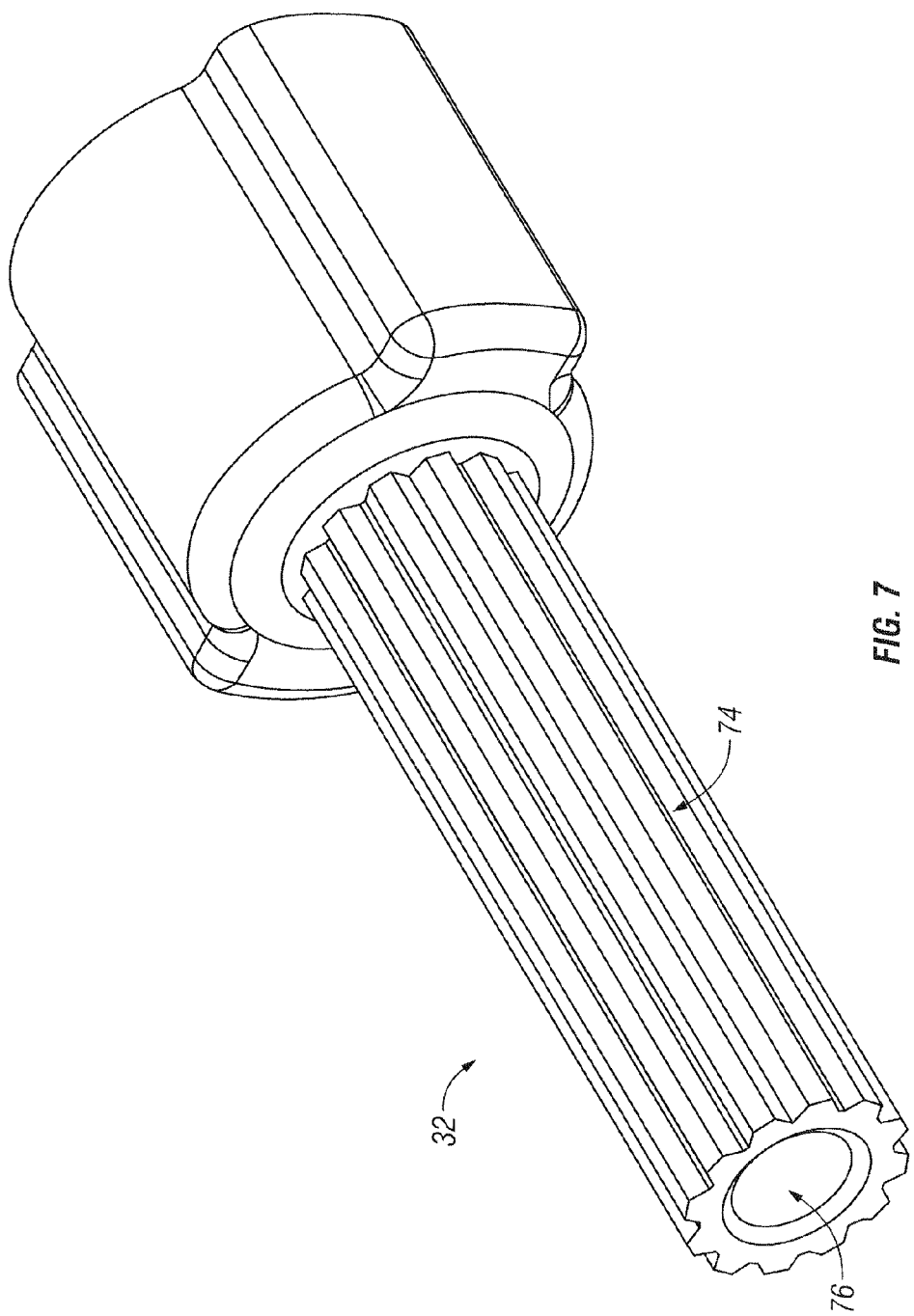
FIG. 7 is a perspective view of the stem adaptor.
Figure 8:
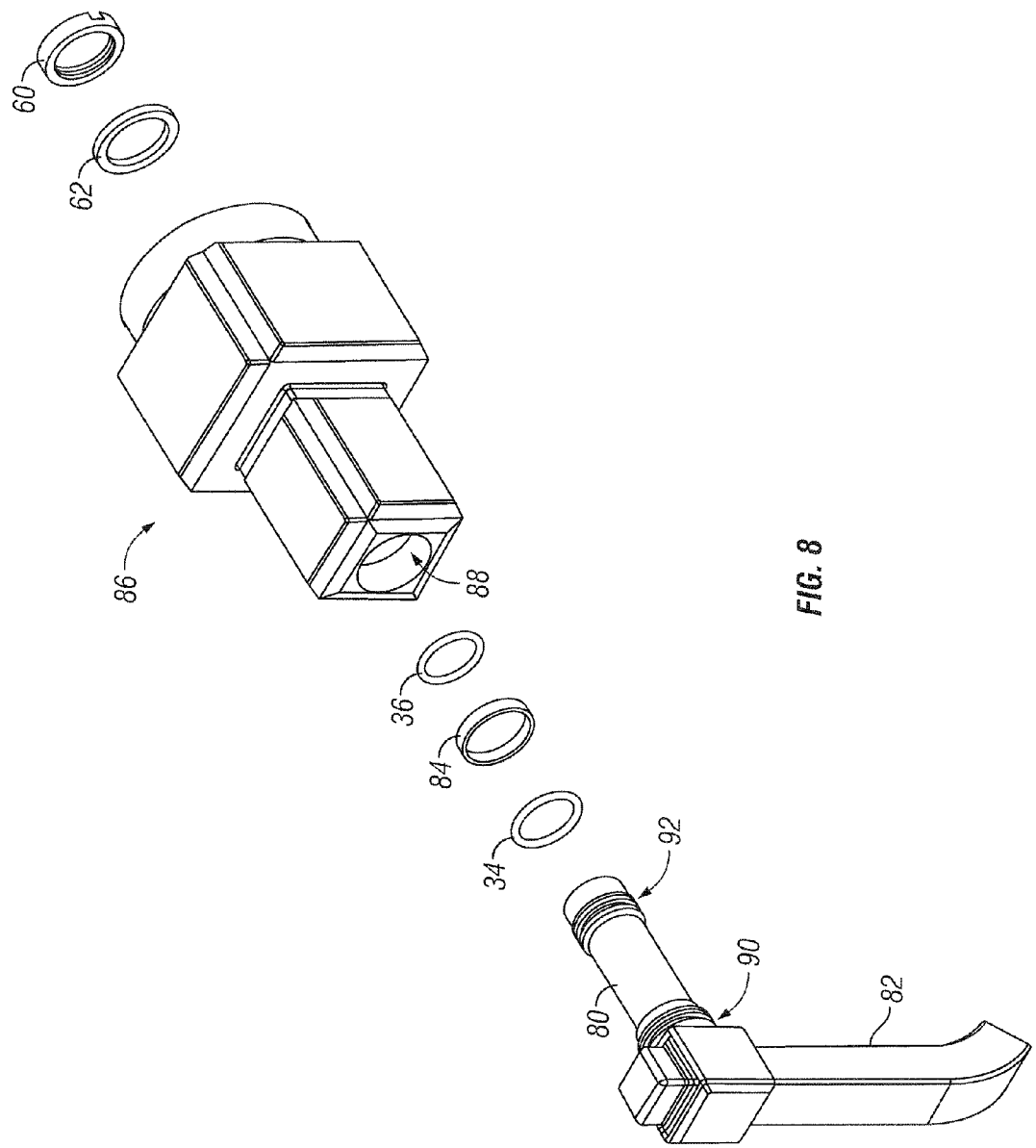
FIG. 8 is a perspective exploded view of another illustrative embodiment of a fossil handle assembly.

A perspective view of stem adaptor 32 is shown in FIG. 7. This view shows the outer surface of stem 32 having a broach pattern 74 which is configured to match a corresponding pattern on the wall surface of cavity 38 of block 44. Consequently, as block 44 rotates, it causes valve stem 32 to rotate as well. As is typically the case, stem 32 is attached to valve 20 (see FIG. 2). Bore 76 is illustratively disposed through stem 32 to accommodate fastener 64 that attaches stem 32 to valve 20.

FIGS. 8-12 show another embodiment of the present disclosure. This embodiment employs a handle 82 that is rotatable with respect to handle hub assembly 86. Handle 82 includes a cylindrical hub 80 configured to receive o-rings 34 and 36, as well as caller 84, washer 62, and threaded ring 60. In this illustrative embodiment, hub 80 extends through opening 88 and handle hub assembly 86 coupled to washer 62 and threaded ring 60. Cylindrical hub 80 further includes ribs 90 and 92 that fit o-rings 34 and 84, and o-ring 36, respectively. Hub 80 fits over stem 32 to activate the water valve, similar to that described in the prior embodiment.

Figure 9:
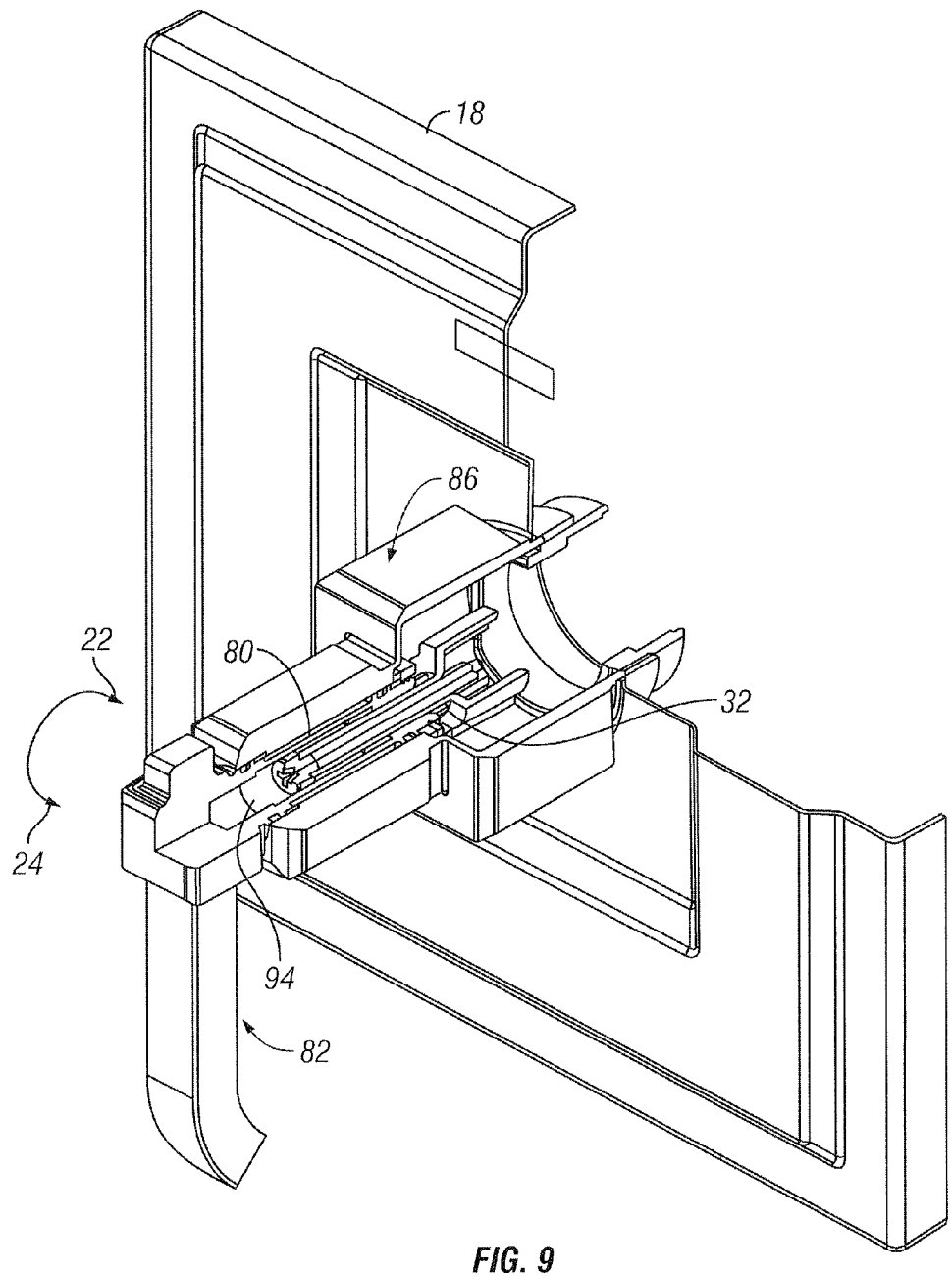
FIG. 9 is a perspective, partially cut-away view of the faucet handle assembly of FIG. 8 with a trim shower flange.

The cut-away perspective view of handle 82 in handle hub assembly 86 coupled to flange 18 is shown in FIG. 9. This view illustrates how cylindrical hub 80 has a cavity 94 that is engageable with valve stem 32 which is engageable with and controls the operation of the water valve (not shown). In this illustrative embodiment, similar to the prior embodiment, stem 32 may have a textured surface that is engageable by a broach pattern on the inside surface of cavity 94 creating the gripping contact. Accordingly, rotating handle 82 in either directions 22 or 24 to correspondingly rotate stem 32 controls the water without rotating handle hub assembly 86. As handle 82 rotates, however, handle hub assembly 86 does not rotate.

Figure 10:
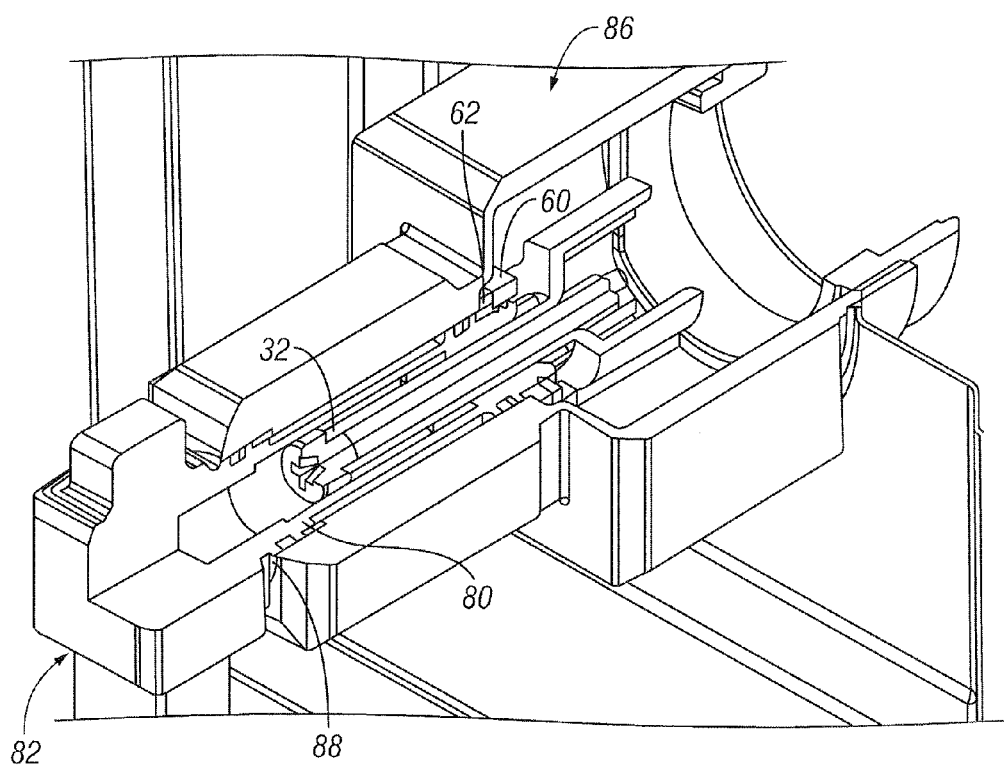
FIG. 10 is a detail view of the faucet handle assembly, trim shower flange, and valve of FIG. 9.

The detail view of handle 82 and handle hub assembly 86 in FIG. 10 shows how stem 32 engages the interior of cylindrical hub 80. Fitted in opening 88 cylindrical hub 80 extends therethrough engaging stem 32. Similar to the prior embodiment, cylindrical hub 80 couples to threaded ring 60 and washer 62 which helps stabilize handle assembly 82 while rotating.

Figure 11:
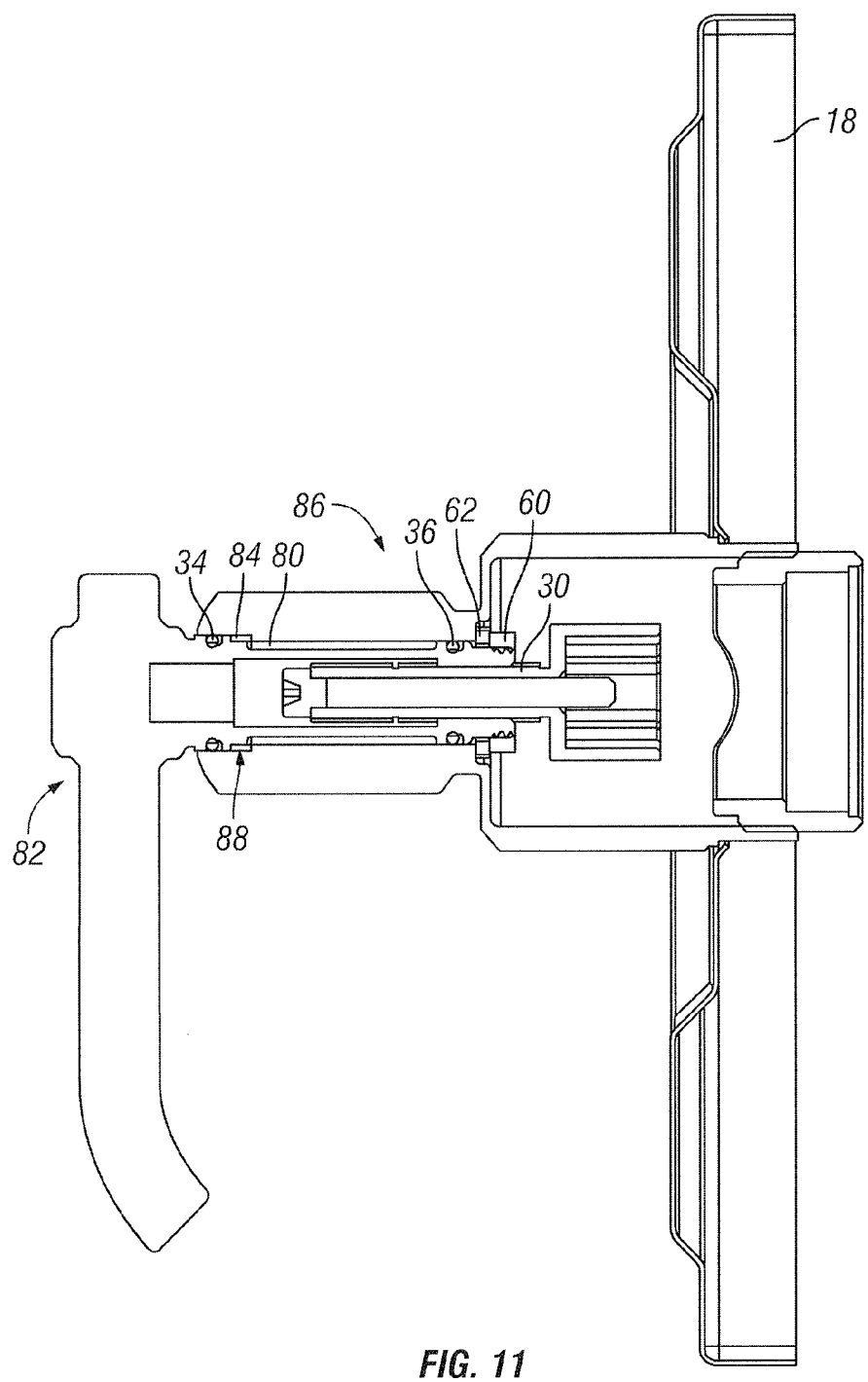
FIG. 11 is a side cross-sectional view of the faucet handle assembly and trim shower flange of FIGS. 8-10.

A side cross-sectional view showing handle 82, handle hub assembly 86 and flange 18 is shown in FIG. 11. This view shows cylindrical hub 80 and opening 88 engaging stem 32 for rotating same. Also shown in this view is the positioning of o-rings 34 and 36 along with collar 84. Washer 62 is shown engaged to hub 80. Similarly, threaded ring 60 is threaded onto the end of cylindrical hub 80 to aid in stabilizing handle 82, as previously discussed.

Figure 12:
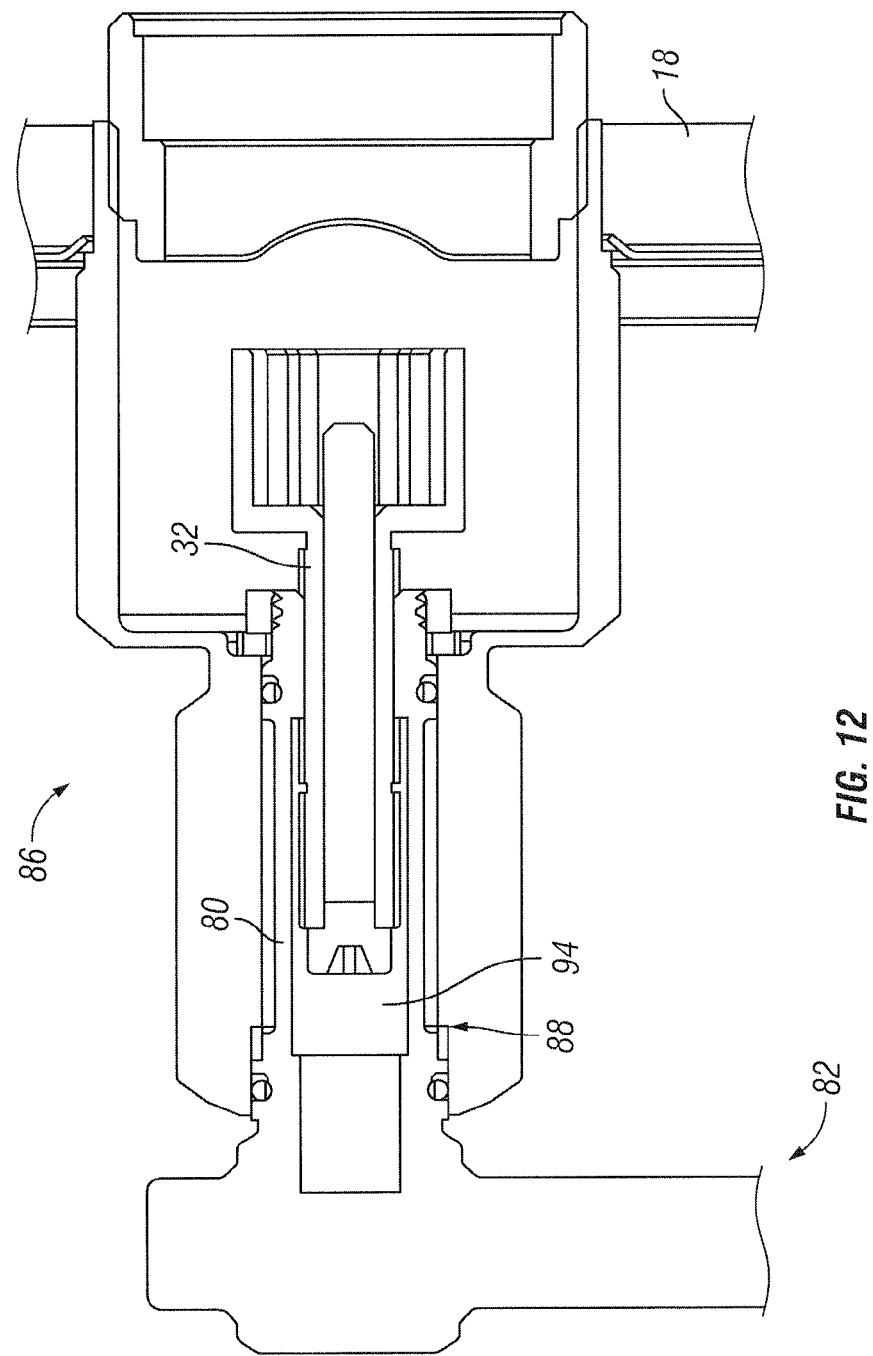
FIG. 12 is a detail view of the faucet handle assembly of FIG. 11.

The detail view of FIG. 12 similarly shows handle 82 and handle hub assembly 86 attached to flange 18. Cylindrical hub 80 is shown extended into opening 88 and stem 32 is inserted into cavity 94 engaging same. As handle 82 rotates, it rotates stem 32. It can be appreciated from this view how handle 82 may be rotated and, thus, engaging and rotating stem 32 without causing handle hub assembly 86 to rotate, in contrast to the prior embodiment.

Although the present disclosure has been described with reference to particular means, materials, and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A bath spout faucet assembly comprising:
a handle portion;
wherein the handle portion includes a bore disposed therein;
wherein the handle portion also includes a cylindrically-formed slot;
wherein the cylindrically-formed slot is located concentrically around the bore and includes an outer wall surface;
a hub portion;
wherein the hub portion is cylindrically-formed and sized to fit into the cylindrically-formed slot of the handle portion;
wherein the cylindrically-formed hub portion forms an opening that is configured to be in communication with the bore in the handle portion, and configured to receive a stem portion of a valve assembly;
wherein the handle portion is configured to rotate with respect to the hub portion to cause engagement between the outer wall surface of the cylindrically-formed slot and the hub portion;
wherein the bore in the handle portion is configured to receive the stem portion; and
wherein the handle portion is configured to rotate the stem portion.

2. The bath spout faucet assembly of claim 1, further comprising at least one o-ring fitted on the hub portion and configured to be located between the hub portion and the outer wall surface of the cylindrically-formed slot.

3. The bath spout faucet assembly of claim 1, wherein the handle portion comprises a handle and a handle block, wherein the cylindrically-formed slot and bore are located in the handle block.

4. The bath spout faucet assembly of claim 3, further comprising a fastener that couples the handle and the handle block together.

5. The bath spout faucet assembly of claim 1, wherein the bore includes a periphery surface which has a broach pattern configured to engage a surface texture on the stem portion.

6. The bath spout faucet assembly of claim 5, further comprising a stabilizer ring threaded onto a handle block of the handle portion and located adjacent the hub portion.

7. The bath spout faucet assembly of claim 6, wherein the stabilizer ring is attached to the handle portion between the cylindrically-formed slot and the bore.

8. The bath spout faucet assembly of claim 1, wherein the hub portion is configured to couple to a flange.

9. A bath spout faucet assembly comprising:
a handle having a bore disposed therein and a cylindrically-formed slot located concentrically around the bore;
a hub configured to fit into the cylindrically-formed slot of the handle;
a stabilizer ring threaded onto the handle and located adjacent the hub;
wherein the hub is configured to be fixed relative to a shower wall;
wherein the hub includes an opening that is configured to be in communication with the bore in the handle, and configured to receive a stem portion of a valve assembly;
wherein the bore in the handle is configured to receive and engage the stem portion; and
wherein the handle is configured to rotate the stem portion.

10. The bath spout faucet assembly of claim 9, further comprising at least one o-ring fitted on the hub and configured to be located between the hub and an outer wall surface of the cylindrically-formed slot.

11. The bath spout faucet assembly of claim 9, wherein the handle is rotatable with respect to the hub.

12. The bath spout faucet assembly of claim 9, wherein the bore includes a periphery surface which has a broach pattern configured to engage a surface texture on the stem portion.

13. The bath spout faucet assembly of claim 12, wherein the stabilizer ring is attached to the handle between the cylindrically-formed slot and the bore.

14. The bath spout faucet assembly of claim 9, wherein the hub is configured to couple to a flange.

15. A bath spout faucet assembly comprising:
a hub portion;
wherein the hub portion is configured to retain a flange;
wherein the hub portion is configured to retain the handle portion;
wherein the hub portion is affixed to a stationary area of a valve/cartridge;
a handle portion, wherein the handle portion includes a bore and a cylindrically-formed slot located concentrically around the bore, the cylindrically-formed slot including an outer wall surface; and wherein the handle portion is configured to rotate with respect to the hub portion to cause engagement between the outer wall surface of the cylindrically-formed slot and the hub portion.

\* \* \* \* \*